United States Patent Office 3,308,118
Patented Mar. 7, 1967

3,308,118
SULFANILAMIDES
Markus Zimmermann, Riehen, Switzerland, assignor to Geigy Chemical Corporation, Greenburgh, N.Y., a corporation of Delaware
No Drawing. Filed Dec. 5, 1963, Ser. No. 328,174
Claims priority, application Switzerland, Dec. 7, 1962, 14,454/62
3 Claims. (Cl. 260—239.75)

The present invention concerns new sulfanilamide derivatives which have valuable chemotherapeutical properties, as well as a process for producing the same.

It has been found that the compounds of the general Formula I,

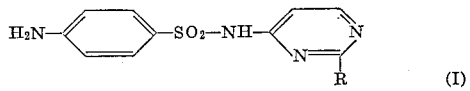

wherein R represents a chlorine or a bromine atom, having excellent antibacterial activity.

To produce these new compounds, a salt, particularly an alkali metal salt of the formula

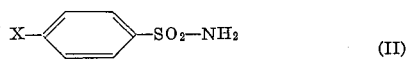

wherein X is the amino group or a group containing nitrogen which can be converted into an amino group, is reacted with a pyrimidine derivative of one of the Formulas III and IV below:

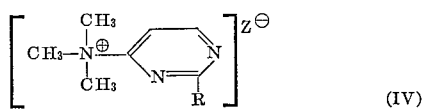

wherein Y represents a lower alkylsulfonyl radical, in particular the methylsulfonyl radical, or a chlorine or bromine atom, Y preferably being the same as R, which latter has the meaning given hereinbefore, and $Z^-$ represents a monovalent anion, in particular a halogen ion corresponding to the halogen atom R or a normal equivalent of a polyvalent anion; if necessary, the group X is converted into the free amino group. The reactions of (II) with (III), or (II) with (IV) are performed in a suitable organic solvent such as dimethyl formamide, acetamide, N,N-dimethyl-acetamide, dimethylsulfoxide, at a temperature within the range of 0 to 90° C.

Nitrogen-containing radicals which can be converted into the free amino group falling under X are more in particular:

(a) radicals which can be converted to the amino group by hydrolysis, e.g. lower alkanoylamino radicals such as the acetylamino radical or lower alkoxycarbonylamino radicals; furthermore, for example, the benzylideneamino radical or the p-dimethylamino-benzylideneamino radical;

(b) radicals which can be converted into the amino group by reduction, e.g. the nitro group; and (c) radicals containing substituted azo groups such as, e.g. the phenylazo radical or p-dimethylamino-phenylazo radical, also e.g. the benzyloxycarbonylamino radical or, again, the benzylideneamino group.

Another radical which can be reduced to the amino group is the nitrilo radical

which is bound by one of its three valences to a benzene ring. In this case the general Formula II represents a divalent radical, and two of these radicals joined together give azobenzene-4,4'-disulfonamide which is reacted with two molecules of a pyrimidine derivative of the general Formula III or IV.

The hydrolysis of compounds having a radical X which can be hydrolysed to the amino group can be performed, for example in an acid medium, preferably by heating with hydrochloric acid in dioxane or methanol; alkoxycarbonylamino compounds are also hydrolysed under mild alkaline conditions, e.g. with 1 N to 2 N-sodium hydroxide solution at room temperature 20° C. The groups mentioned above under (b) and (c) can be reduced in a conventional manner, if necessary with catalysts, for instance, with hydrogen in the presence of Raney nickel in an inert organic solvent, or by other chemical processes such as the reduction of nitro groups and also of azo groups with iron in acetic acid or hydrochloric acid.

Starting materials of the general Formula III having a lower alkylsulfonyl radical as Y are obtained, e.g. by reacting 2,4-dichloro or 2,4-dibromopyrimidine with one mole of an alkali metal alkylmercaptide and oxidizing the 4-alkylthio-2-chloro- or bromo-pyrimidine, for example, with hydrogen peroxide.

The starting materials of the general Formula IV are obtained, for example, by reacting 2,4-dichloropyrimidine or 2,4-dibromopyrimidine with 1 mole of trimethylamine in a suitable solvent, for example, benzene.

The new sulfanilamides according to the invention are suitable for the preparation of pharmaceuticals for internal or external application, e.g. for the treatment of infections caused by gram-positive bacteria such as Staphylococci, Streptococci, Pneumococci, Mycobacterium tuberculosis, as well as by gram-negative bacteria such as *Salmonella typhi, Escherichia coli, Klebsiella pneumoniae.* They are distinguished by their great antibacterial action which is also extended to the urinary tract since they are eliminated practically unchanged.

For administration, they are combined with suitable carriers to form, e.g. tablets, dragées, suppositories or syrups or, e.g. powders, or unit doses are filled into capsules. They may also be used in the form of their salts, e.g. as sodium, potassium, lithium, magnesium or calcium salts, or as salts with organic bases such as ethylamine, dimethylamine, diethylaminoethanol, morpholine, ethylenediamine, aminoethanol, diethylamine, diethanolamine or triethanolamine, which have a neutral to weakly alkaline reaction, some of which are water-soluble, for example, aqueous solutions may be used for injections.

Where "lower" is used in this specification in connection with an aliphatic radical, it means a radical with from not more than 4 carbon atoms.

The following non-limitative examples serve to further illustrate the production of the new compounds. The temperatures are in degrees centigrade.

*Example 1*

7.5 grams (g.) of 2,4-dichloropyrimidine are added to a suspension of 23.3 g. of sulfanilamide sodium in 60 milliliters (ml.) of distilled dimethyl formamide and the bath temperature is raised to 60° within 2 to 3 hours while stirring. The mixture is stirred at this temperature for a further 10 hours and then the solvent is distilled in vacuo. The residue is dissolved in 70 ml. of water and solid carbon dioxide is added until a pH of 7 to 8 is observed. The unreacted excess of sulfanilamide is filtered off. The pH of the filtrate is adjusted to 4 to 5 with aqueous 5 N hydrochloric acid. The precipitate of the reaction product, which is at first greasy, crystallized on cooling. After recrystallization from ethanol, pure 2-chloro-4-sulfanilamido-pyrimidine is obtained which melts at 210° (with decomposition, after immersing the capillary at approximately 205°). An $R_F$ value of 0.16 is obtained in the thin layer chromatogram on kieselguhr ("Kieselgel G Merck") using chloroform:methanol, of volume ratio 4:1 as eluting agent.

*Example 2*

(a) 200 g. of phosphoroxybromide are dissolved in 300 ml. of dry toluene and 32.5 g. of 2,4-dihydroxy pyrimidine are added. 28 ml. of dimethylaniline are added dropwise while stirring and the mixture is heated for 10 hours at a bath temperature of 110–120° After cooling, the excess phosphoroxybromide is decomposed by pouring the reaction mixture on to 500 g. of ice. The toluene layer is separated, washed with water and dried with calcium chloride. After distilling the toluene, a brown oil remains which is diluted with 20 ml. of ether and then crystallized by adding 100 to 200 ml. of petroleum ether. The 2,4-dibromo-pyrimidine melts at 65–67°.

(b) 15.6 g. of sulfanilamide sodium are stirred in 60 ml. of dry dimethyl formamide while cooling with ice, and 9.6 g. of 2,4-dibromo-pyrimidine are added in small portions. After stirring for 3 hours while cooling with ice, the temperature is raised to 20 to 25° and stirring is continued for 18 hours. 200 ml. of water are then added to the reaction mixture the pH of which is adjusted to 4 to 5 with aqueous 5 N hydrochloric acid. The precipitate which forms is recrystallised from a mixture of acetone-water. The 2-bromo-4-sulfanilamido-pyrimidine melts at 220° (with decomposition after immersing the capillary at approximately 210°); it shows a $R_F$ value of 0.21 (chloroform:methanol, volume ratio 4:1 when chromatographed on "Kieselgel G Merck").

*Example 3*

(a) 7.5 g. of 2,4-dichloro-pyrimidine are dissolved in 75 ml. of absolute ether and stirred while cooling with ice. A solution of 3.2 g. of trimethylamine on 20 ml. of dry benzene is added dropwise and the whole is stirred for 2 hours while cooling with ice. The quaternary salt is then removed by suction and washed with a small amount of ether.

(b) 3.88 g. of sulfanilamide sodium are suspended in 7 ml. of dimethylacetamide and stirred while cooling with ice. 2.1 g. of the quaternary salt obtained under (a) are added into the suspension which is then stirred for 20 hours at 20°. After adding 50 ml. of water, a clear solution is formed to which solid carbon dioxide is added until the pH of the solution reaches 8. It is then cooled for approximately 1 hour with ice and the excess sulfanilamide is filtered off. The filtrate is adjusted to pH 4 to 5 with aqueous 2 N-hydrochloric acid and cooled for 2 to 4 hours after which time the reaction product is removed by suction. It is then purified, e.g. by recrystallizing and is identical with the 2-chloro-4-sulfanilamido-pyrimidine obtained acording to Example 1. The thin layer chromatogram (Kieselgel G Merck; choloform:methanol, volume ratio 4:1) shows an $R_F$ value of 0.16.

*Example 4*

7.5 g. of 2,4-dichloro-pyrimidine are heated for 15 hours to 50° with 28.3 g. of $N^4$-acetylsulfanilamide sodium in 80 ml. of dry dimethylformamide and stirred. The reaction temperature is then raised to 90° and the solvent is distilled off in high vacuum after 4 hours. The residue is stirred with 100 ml. of water and adjusted to pH 7 to 8 by adding solid carbon dioxide. Excess $N^4$-acetyl-sulfanilamide is filtered off and the filtrate is made acid to pH 3 with aqueous 5 N hydrochloric acid thereby causing a greasy precipitate to form. This is dissolved in 50 ml. of alcohol and the solution is diluted with 20 ml. of water. On standing, the crystalline 2-chloro-4-($N^4$-acetyl-sulfanilamido)-pyrimidine precipitates. It sinters considerably at 120°, solidifies again at a higher temperature and melts at 210–215° while turning yellow and causing gas development. A sample of the substance obtained by acetylating the product of Example 1, as well as a mixture of the two substances, show the same behaviour on melting.

The saponification of the $N^4$-acetyl derivative is performed while heating to 80 to 90° for 1 to 2 hours using a mixture of aqueous concentrated hydrochloric acid and dioxan (volume ratio 1:10). It is then evaporated to dryness in vacuo, the residue is well mixed with aqueous 2 N-hydrochloric acid and the mixture filtered with suction. The pH of the filtrate is adjusted to 4 to 5 with aqueous 2 N-sodium hydroxide solution, and the precipitate is recrystallized several times from ethanol. In the thin layer chromatogram, performed as described in Example 1, the 2-chloro-4-sulfanilamido-pyrimidine obtained shows the spot characteristic for this substance, with R=0.16.

When repeating the method of the first paragraph of this example, but using $N^4$-methoxycarbonyl-sulfanilamide sodium instead of $N^4$-acetyl-sulfanilamide sodium, there is obtained 2-chloro-4-($N^4$-methoxycarbonyl-sulfanilamido)-pyrimidine.

The $N^4$-carbomethoxy derivative is left to stand for 15 hours at 20° in aqueous 10%-sodium hydroxide solution; whereupon the mixture is adjusted to pH 8 with aqueous 5 N hydrochloric acid. The mixture is then cooled for 1 hour in an ice bath, filtered with suction, and the filtrate is adjusted to pH 4. The resulting precipitated crude saponification product shows an $R_F$ value of 0.16 in the thin layer chromatogram (performed as in Example 1). Repeated crystallization from ethanol yields pure 2-chloro-4-sulfanilamido-pyrimidine.

I claim:

1. A compound of the formula

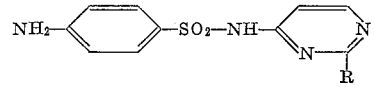

wherein R is a halogen atom of an atomic number of from 17 to 35.

2. The compound of the formula

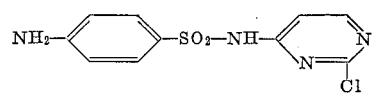

3. The compound of the formula

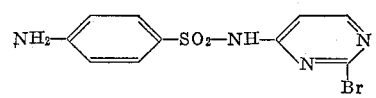

References Cited by the Examiner

UNITED STATES PATENTS 2,494,524   1/1950   Sprague _____ 260—239.75
2,540,356   2/1951   Sprague _____ 260—239.75

OTHER REFERENCES

Backer et al.: Rec. Trav. Chim., vol. 64, pp. 115 to 121 (1945).

Chemical Abstracts, vol. 46, col. 9986 (1952).

Northey, The Sulfonamides and Allied Compounds, pp. 78 to 79, Reinhold Pub. Corp., New York (1948).

Roblin et al.: J. Am. Chem. Soc., vol. 64, pp. 567–570 (1942).

JOHN D. RANDOLPH, *Primary Examiner.*

WALTER A. MODANCE, *Examiner.*